(12) United States Patent
Oosawa (10) Patent No.: US 7,680,352 B2
(45) Date of Patent: Mar. 16, 2010

(54) PROCESSING METHOD, IMAGE PROCESSING SYSTEM AND COMPUTER PROGRAM (75) Inventor: Akira Oosawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 961 days.

(21) Appl. No.: 11/048,848

(22) Filed: Feb. 3, 2005

(65) Prior Publication Data

US 2005/0169508 A1 Aug. 4, 2005

(30) Foreign Application Priority Data

Feb. 4, 2004 (JP) ............................. 2004-027457

(51) Int. Cl.
*G06K 9/40* (2006.01)
*G06K 9/36* (2006.01)
(52) U.S. Cl. .................... 382/254; 382/162; 382/232
(58) Field of Classification Search ................ 382/128, 382/162–167, 232–237, 254–276
See application file for complete search history.

(56) References Cited

U.S. PATENT DOCUMENTS

| | | | | | |
|---|---|---|---|---|---|
| 4,553,206 A | * | 11/1985 | Smutek et al. | ............... | 707/101 |
| 4,680,628 A | * | 7/1987 | Wojcik et al. | ............... | 378/98.2 |
| 4,717,646 A | * | 1/1988 | Giorgi | ............... | 430/359 |
| 4,730,212 A | * | 3/1988 | Wojcik et al. | ............... | 348/61 |
| 4,739,521 A | * | 4/1988 | Akimoto | ............... | 398/109 |
| 5,173,787 A | * | 12/1992 | Mitani | ............... | 382/232 |
| 5,209,220 A | * | 5/1993 | Hiyama et al. | ............... | 600/109 |
| 5,225,900 A | * | 7/1993 | Wright | ............... | 358/501 |
| 5,267,153 A | * | 11/1993 | Shimura et al. | ............... | 382/232 |
| 5,289,548 A | * | 2/1994 | Wilson et al. | ............... | 382/250 |
| 5,488,674 A | * | 1/1996 | Burt et al. | ............... | 382/284 |
| 5,539,914 A | * | 7/1996 | Fry et al. | ............... | 710/7 |
| 5,572,499 A | * | 11/1996 | Kohtani et al. | ............... | 369/83 |
| 5,615,287 A | * | 3/1997 | Fu et al. | ............... | 382/232 |
| 5,631,742 A | * | 5/1997 | Shimoda | ............... | 386/52 |
| 5,689,346 A | * | 11/1997 | Noda et al. | ............... | 358/426.11 |
| 5,757,974 A | * | 5/1998 | Impagliazzo et al. | ............... | 382/248 |

(Continued)

FOREIGN PATENT DOCUMENTS

GB 98/00938 * 3/1998

(Continued)

OTHER PUBLICATIONS

Integrating JPEG compression with DICOM: experiences and technical issues, N.H. Olges, M. Eichelberg, J. Riesmeier, and P.F. Jensch; Medical Imaging 2000: PACS Design and Evaluation: Engineering and Clinical Issues, vol. 3980, pp. 46-56, San Diego, CA, USA.*

(Continued)

*Primary Examiner*—Manav Seth
(74) *Attorney, Agent, or Firm*—Sughrue Mion, PLLC (57) ABSTRACT

Image analysis is executed by the use of an image representing an object. The image has image processing information, on image processing which the image has undergone, attached to the image. The image processing information attached to the image is obtained from the image and the image is corrected on the basis of the image processing information so that the image approaches to an image optimal to the image analysis. The image analysis is executed by the use of the corrected image.

15 Claims, 3 Drawing Sheets

U.S. PATENT DOCUMENTS

| | | | | |
|---|---|---|---|---|
| 5,796,874 | A * | 8/1998 | Woolfe et al. | 382/254 |
| 5,852,742 | A * | 12/1998 | Vondran et al. | 712/28 |
| 5,859,920 | A * | 1/1999 | Daly et al. | 382/115 |
| 5,875,249 | A * | 2/1999 | Mintzer et al. | 380/54 |
| 5,907,642 | A * | 5/1999 | Ito | 382/302 |
| 6,094,453 | A * | 7/2000 | Gosselin et al. | 375/240.24 |
| 6,141,452 | A | 10/2000 | Murao | 382/240 |
| 6,246,802 | B1 * | 6/2001 | Fujihara et al. | 382/276 |
| 6,266,451 | B1 * | 7/2001 | Charrier et al. | 382/249 |
| 6,301,010 | B1 * | 10/2001 | Kajita | 358/1.13 |
| 6,304,345 | B1 * | 10/2001 | Patton et al. | 358/527 |
| 6,314,452 | B1 * | 11/2001 | Dekel et al. | 709/203 |
| 6,337,930 | B1 * | 1/2002 | Owada et al. | 358/3.28 |
| 6,381,348 | B2 | 4/2002 | Takeo | |
| 6,433,888 | B1 * | 8/2002 | Patton et al. | 358/1.18 |
| 6,546,139 | B1 * | 4/2003 | Kondo et al. | 382/232 |
| 6,640,016 | B1 * | 10/2003 | Ito | 382/263 |
| 6,647,127 | B1 * | 11/2003 | Aoshima et al. | 382/100 |
| 6,836,565 | B1 * | 12/2004 | Nishikawa | 382/167 |
| 6,859,155 | B2 * | 2/2005 | Kondo et al. | 341/106 |
| 6,873,726 | B2 * | 3/2005 | Tomaru | 382/162 |
| 6,959,107 | B2 | 10/2005 | Kasai | |
| 7,072,498 | B1 * | 7/2006 | Roehrig et al. | 382/128 |
| 7,215,822 | B2 * | 5/2007 | Murai et al. | 382/264 |
| 7,269,303 | B2 * | 9/2007 | Miller et al. | 382/305 |
| 7,274,827 | B2 * | 9/2007 | Horita | 382/264 |
| 7,315,657 | B2 * | 1/2008 | Matsushima | 382/274 |
| 7,400,349 | B2 * | 7/2008 | Okada | 348/231.3 |
| 2002/0062075 | A1 | 5/2002 | Takeo | |
| 2002/0131628 | A1 * | 9/2002 | Toda | 382/132 |
| 2003/0161516 | A1 * | 8/2003 | Vuylsteke | 382/128 |
| 2005/0110788 | A1 * | 5/2005 | Turner et al. | 345/419 |

FOREIGN PATENT DOCUMENTS

| | | |
|---|---|---|
| JP | 11-70082 A | 3/1999 |
| JP | 11-155849 A | 6/1999 |
| JP | 2002119499 A | 4/2002 |

OTHER PUBLICATIONS

Improvement of detection in computed radiography by new single-exposure dual-energy subtraction, W. Ito, K. Shimura, N. Nakajima, M. Ishida, and H. Kato; Proc. of SPIE—vol. 1652, Medical Imaging VI: Image Processing, pp. 386-396, Jun. 1992.*

Using an image retrieval system for image data management, T.P. Karnowski, K.W. Tobin, Jr., R.K. Ferrell, W.B. Jatko, and F. Lakhani; Proc. of SPIE—vol. 4692; Design, Process Integration, and Characterization for Microelectronics, Jul. 2002, pp. 120-127.*

"Using an image retrieval system for image data management," T.P. Karnowski, K.W. Tobin, Jr., R.K. Ferrell, W.B. Jatko, and F. Lakhani; Proc. of SPIE—vol. 4692; Design, Process Integration, and Characterization for Microelectronics, Jul. 2002, pp. 120-127.*

"Integrating JPEG compression with DICOM: experiences and technical issues," N.H. Olges, M. Eichelberg, J. Riesmeier, and P.F. Jensch; Medical Imaging 2000: PACS Design and Evaluation: Engineering and Clinical Issues, vol. 3980, pp. 46-56, San Diego, CA, USA.*

"Improvement of detection in computed radiography by new single-exposure dual-energy subtraction," W. Ito, K. Shimura, N. Nakajima, M. Ishida, and H. Kato; Proc. of SPIE—vol. 1652, Medical Imaging VI: Image Processing, pp. 386-396, Jun. 1992.*

* cited by examiner

S11 IMAGE DATA OF E OBTAINED

S12 QL VALUES EXTRACTED

S13 QL VALUE TRANSFORMATION FORMULA DERIVED

S14 QL VALUES TRANSFORMED

S15 IMAGE ANALYSIS

FIG.6

PROCESSING METHOD, IMAGE PROCESSING SYSTEM AND COMPUTER PROGRAM

BACKGROUND OF THE INVENTION

1. Field of the Invention

This invention relates to a method of and a system for image processing and a computer program for image processing, and more particularly to a method of and a system for image processing in which an image analysis processing is carried out by the use of the image of an object, and a computer program for causing a computer to execute the image analysis.

2. Description of the Related Art

There has been put into practice to output and view a digital image on a screen. The image has generally undergone image processing to facilitate viewing the image. For example, in the medical field, when a medical image for image diagnosis is output on the screen, generally the medical image undergoes image processing such as gradation processing or frequency processing so that the disease can be easily viewed.

Recently, images has come to be easily transmitted and received through a network as the spread of standard such as DICOM.

Under such a condition, cases where processed images (images which has undergone image processing) are stored for subsequent reuse are increased. With increase of such cases, there are an increasing number of cases where processed images and unprocessed images (images which has undergone no image processing) mingle in an object of analysis comprising images which are to be analyzed and undergoes a predetermined image processing. For example, in so-called CAD (computer-aided diagnosis), digital medical images are analyzed with a computer in order to extract disease from the digital medical images as disclosed, for instance, in U.S. Patent Application Publication No. 20020062075. There is sometimes a case where the medical images to be the object of the CAD include images which have been at least once read and undergoes gradation processing or frequency processing for enhancing anatomical structures or their edges to facilitate reading in addition to normal unprocessed images.

The image analysis has been optimized for images of predetermined properties (gradation properties, frequency properties or the like) and generally has been optimized for unprocessed images. When the image analysis is carried out on a processed image which has undergone image processing and accordingly is not adapted to the image analysis, the analyzing result can be adversely affected. For example, when the CAD is executed on a medical image which has undergone the gradation processing for enlarging the contrast between bones and soft parts, the edges of the bones can be mistaken for diseased parts.

SUMMARY OF THE INVENTION

In view of the foregoing observations and description, the primary object of the present invention is to provide a method of and a system for image processing in which the image-analyzing accuracy can be ensured independent of whether the image to be analyzed has undergone image processing.

Another object of the present invention is to provide a computer program for causing a computer to execute the image processing.

We have investigated an image processing system which, when a processed image is included in images by operation between which a subtraction image is to be obtained, obtains a subtraction image suppressed with artifacts by correcting the processed image to an image equivalent to the image before the image processing, which the processed image has undergone, on the basis of the information on the image processing attached to the processed image. (Japanese Patent Application 2002-349806) However, the invention differs from this invention in "the problem to be solved by the invention" and "the arrangement of the invention" in that the invention has been made to suppress generation of artifacts in the subtraction image, and in the invention, the subtraction image should be obtained by operation between images.

In accordance with a first aspect of the present invention, there is provided a method of image processing for executing an image analysis by the use of an image representing an object, wherein the improvement comprises that the image has image processing information, on image processing which the image has undergone, attached thereto, and the method comprises the steps of obtaining from the image the image processing information attached thereto, correcting the image on the basis of the image processing information so that the image approaches to an image optimal to the image analysis and executing the image analysis by the use of the corrected image.

In accordance with a second aspect of the present invention, there is provided a system for image processing for executing an image analysis by the use of an image representing an object, wherein the improvement comprises that the image has image processing information, on image processing which the image has undergone, attached thereto, and the system comprises an image processing information obtaining means which obtains from the image the image processing information attached thereto, a correction means which corrects the image on the basis of the image processing information so that the image approaches to an image optimal to the image analysis and an image analysis means which executes the image analysis by the use of the corrected image.

In accordance with a third aspect of the present invention, there is provided a computer program for causing a computer to execute the procedure of inputting an image of an object having image processing information, on image processing which the image has undergone, attached thereto, obtaining from the image the image processing information attached thereto, correcting the image on the basis of the image processing information so that the image approaches to an image optimal to the image analysis and executing predetermined image analysis by the use of the corrected image.

The computer program may be recorded on a computer readable-medium. A skilled artisan would know that the computer-readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In the system for image processing in accordance with the second aspect of the present invention, the image processing information may include processing check information which represents whether or not the image is a processed image which has undergone image processing, and may include, when the processing check information represents that the image is a processed image, processing condition information which represents the conditions under which the image processing has been carried out on the image, the image optimal to the image analysis may be an image before the image processing is carried out on the image, and the correcting means may determine on the basis of the processing check information whether or not the image is a processed image and may carry out on the basis of the processing condition information on an image which is determined to be a processed image by the determination processing reverse to the image processing which the image has undergone. (This system for image processing will be referred to as the "first image processing system", hereinbelow.)

In the system for image processing in accordance with the second aspect of the present invention, the image processing information may include processing check information which represents whether or not the image is a processed image which has undergone image processing, the image optimal to the image analysis may be an image before the image processing is carried out on the image, and the correcting means may determine on the basis of the processing check information whether or not the image is a processed image and may carry out on an image which is determined to be a processed image by the determination processing reverse to a representative of image processing which the image has undergone. (This system for image processing will be referred to as the "second image processing system", hereinbelow.)

Further, in the system for image processing in accordance with the second aspect of the present invention, the image optimal to the image analysis may be an image having a predetermined property, the image processing information may be an image pattern in the image which consists of a plurality of density regions which are set so that each of them has a predetermined density in the image having a predetermined property and reflects the image processing which the image has undergone, and the correcting means may carry out gradation transformation on the image so that each of the density regions in the image pattern has the predetermined density. (This system for image processing will be referred to as the "third image processing system", hereinbelow.)

In the present invention, the term "image processing which the image has undergone" means a data transformation carried on the image under specific image processing conditions which are set on the basis of a standard image according to the area of the object to be remarked or the purpose of viewing the image. The term "standard image" as used here means an image in which an image property (density, contrast or the like) which fluctuated according to conditions such as taking conditions has been standardized to a standard property. The "image processing which the image has undergone" does not include such standardization. Further, the term "image analysis" means processing where information on the object on the image is extracted by analyzing the image. For example, detection of an abnormal shadow or processing for retrieving similar images is included in the image analysis. However, processing for transforming an image itself such as the gradation transformation or frequency processing is not included in the image analysis.

In the first to third image processing systems, the image processing may include gradation processing.

The "gradation processing" as used here means processing for adjusting the density and the contrast of the image. For example, there is conceivable processing where a gradation curve (a curve which represents the correspondence of the transformed pixel value to the original pixel value) is set so that the density band in which the structure of the remarked object is included falls on a main part of the gradation level and the pixel value is transformed according to the gradation curve.

In the first and second image processing systems, the image processing may include the frequency processing.

The "frequency processing" means processing for enhancing specific frequency on the image and may be processing where edges are enhanced by, for instance, carrying out unsharp mask processing on the original image to generate an unsharp image (unsharp mask image), subtracting the unsharp mask image from the original image to extract only the edge components, and adding a multiple times of the edge components to the original image.

In the first and second image processing systems, the "processing check information" and the "processing condition information" may be written in the header of the image data representing the image.

The processing check information may be a parameter having a set value which represents whether the image is a processed image or an unprocessed image. For example, when the value is 0, the image is an unprocessed value and when the value is 1, the image is processed value.

The processing condition information may be the data itself which specifies the conditions under which the image has been processed or a parameter having a set value which represents the type of the image processing which the image has undergone when a plurality of image processing conditions are prepared in advance. For example, when the image processing is gradation processing, the processing condition information may be, in the former case, values of the coordinates which represent a typical point on the gradation curve of the gradation processing which the image has undergone, or, in the latter case, a value of the parameter which specifies one of the plurality of image processing conditions prepared in advance.

In the first image processing system, the "correction means" may be a means for specifying the conditions under which an image has undergone the image processing on the basis of the processing condition information attached to the image which is determined to be a processed image, setting a formula for canceling the effect of the image processing on the basis of the processing conditions specified, and transforming the processed image into the image before the image processing on the basis of the set formula (carrying out processing reverse to the image processing which the image has undergone) and the image analysis means may execute the image analysis by the use of the corrected image. The formula may be obtained either theoretically or empirically.

In the second image processing system, the "correction means" may be a means which assumes that the images determined to be a processed image have undergone a representative of image processing which the images have generally undergone, sets a formula for canceling the effect of the image processing on the basis of the processing conditions specified, and transforms the processed image into an image equivalent to the processed image before the image processing on the basis of the set formula (carries out processing reverse to the image processing which the image has undergone) and the image analysis means may execute the image analysis by the use of the corrected image equivalent to the processed image before the image processing.

To execute the image analysis by the use of the corrected image or the corrected image equivalent to the processed image before the image processing includes both to execute the image analysis by the use of the corrected image or the corrected image equivalent to the processed image before the image processing as it is or to execute the image analysis by the use of the corrected image or the corrected image equivalent to the processed image before the image processing after it undergoes image processing suitable for the image analysis.

In the third image processing system, the "image pattern" may be a step edge in which the density is changed stepwise in predetermined proportion.

Further, the "predetermined image property" may be that under which the relation between the density of the image and a predetermined parameter corresponding to the density of the image is logarithmic-linear.

First and second parameters are expressed to be logarithmic-linear when the logarithms of the first and second parameters are linear to each other.

When the image is an X-ray image in the third image processing system, the "image pattern" may be a step edge obtained by X-raying together with the object a step edge member in which the X-ray transmissivity is controlled so that the amount of X-rays projected onto each predetermined area thereof changes stepwise with the "predetermined image property" being a property under which the QL value of the image (the density of the image) and the amount of X-rays (the predetermined parameter) is logarithmic-linear, that is, the logarithms of the QL value of the image and the amount of X-rays are linear to each other. At the same time, the "correction means" carries out gradation transformation on the image so that the density of each area on the step edge is transformed to a value which is taken in the image in which the QL value of the image and the amount of X-rays is logarithmic-linear.

In the present invention, the "image" may be a radiation image including an X-ray image obtained by a CR (computed radiography) system or a tomogram obtained by a CT system or a MRI system as well as an image taken by a usual digital camera. Further, the object of the image maybe any including an animal, plant, industrial product, landscape, celestial body, and sight as well as a human body.

In the present invention, the "image" may be a medical image and the image analysis may be abnormal shadow detection.

The "abnormal shadow detection" is processing for detecting an abnormal shadow in a medical image. For example, the abnormal shadow detection may be processing in which a prospective abnormal shadow is extracted from a medical image by, for instance, filter processing, a characteristic value reflecting the probability that the prospective abnormal shadow is an abnormal shadow is calculated on the basis of the image neighbor of the prospective abnormal shadow and an abnormal shadow is extracted on the basis of the prospective abnormal shadow as disclosed, for instance, in U.S. Patent Application Publication No. 20020062075.

In the present invention, the "image" may be a medical image and the image analysis may be similar image retrieval.

The "similar image retrieval" is processing for retrieving an image similar to the input image. For example, the similar image retrieval may be processing in which image data representing an object similar to that represented by the input image data is retrieved from an image database in which a number of image data representing objects is stored on the basis of not only the texture information but also the shape information and the result of the retrieval is output as proposed in Japanese Patent Application 2003-208526.

In the present invention, the "image" may be a medical image and the image analysis may be artificial image generation.

The "artificial image generation" is processing for artificially generating a predetermined image corresponding to the input image. For example, the artificial image generation may be processing for artificially generating an image of normal structure of the object corresponding to the input image by obtaining normal image data representing a normal image which is a medical image representing the normal structure of the object, setting a plurality of structure changing vectors for changing the structure of the object in the medical image and adding the structure changing vectors to the normal image data, thereby generating an image of normal structure of the object as proposed in Japanese Patent Application 2003-080637.

In accordance with the method of and a system for image processing and the computer program in accordance with the present invention, in processing for executing an image analysis by the use of an image, the image is corrected on the basis of the image processing information which is on the image processing carried out on the image and is attached to the image so that the image approaches to an image optimal to the image analysis and the image analysis is executed by the use of the corrected image. Accordingly, even if an image not suitable for the image analysis, e.g., a processed image, is to be analyzed, the image analysis can be executed after the image is corrected and the image-analyzing accuracy can be ensured independent of whether the image to be analyzed has undergone image processing.

DESCRIPTION OF THE PREFERRED EMBODIMENTS

Figure 1:
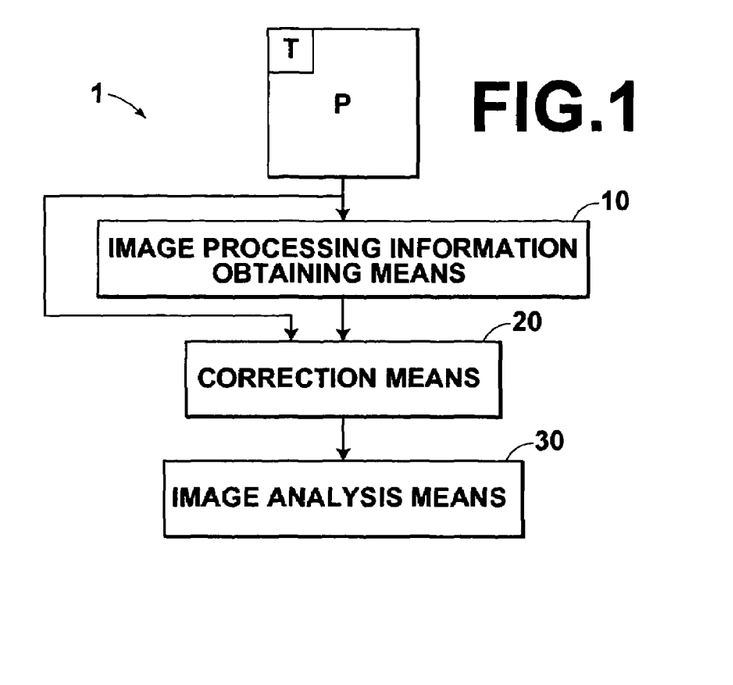
FIG. 1 is a block diagram showing an image processing system in accordance with an embodiment of the present invention.

In FIG. 1, an image processing system 1 in accordance with an embodiment of the present invention comprises an image processing information obtaining means 10 which obtains from an input image P the image processing information T attached thereto, a correction means 20 which corrects the image P on the basis of the image processing information T so that the image P approaches to an image optimal to the image analysis and an image analysis means 30 which executes the image analysis by the use of the corrected image.

The case where CAD processing (abnormal shadow detection) is executed by the use of a medical image will be described, here.

Figure 2:
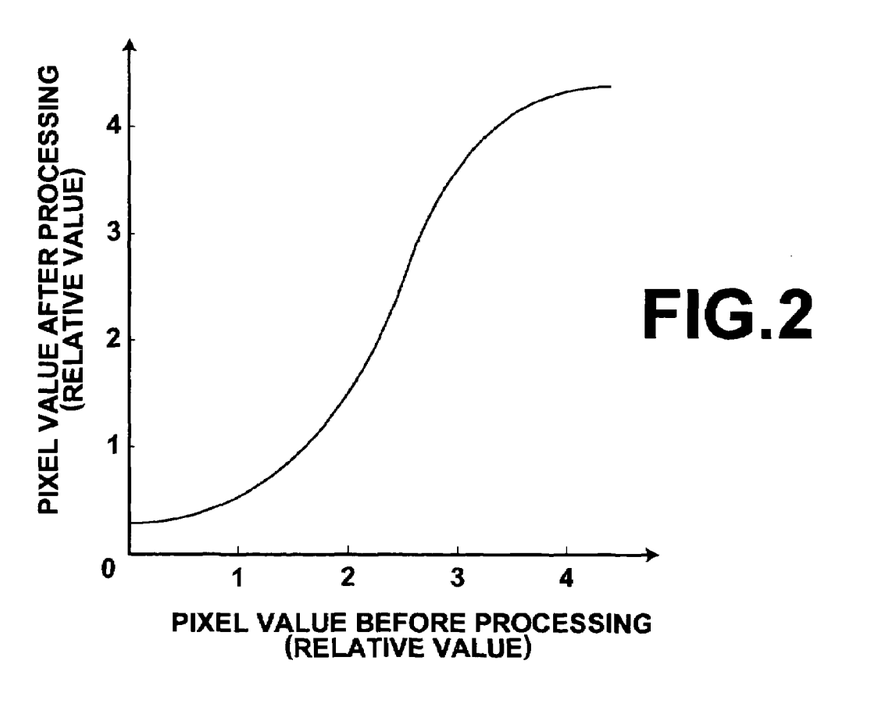
FIG. 2 is a view showing an example of the gradation curve employed in the gradation processing.

As a first embodiment of the present invention, the following conditions are first set. It is assumed that the image P is a medical image and the image processing information T is attached to the image P as header information of the image P. The image processing information T includes processing check information which represents whether or not the image is a processed image which has undergone image processing, and includes, when the processing check information represents that the image is a processed image, processing condition information which represents the conditions under which the image processing has been carried out on the image. For example, the processing check information is a parameter Z which represents whether or not the image is a processed image by a value 0 or 1, and the processing condition information is a parameter G which represents the number of type of the gradation curve employed in the gradation processing. It is assumed that the image optimal to the CAD is an image Po before the image processing (corresponding to the original image), and the image processing is gradation processing. In the gradation processing, a gradation curve representing the correspondence of the pixel values of the image before processing to the pixel values of the image after processing as shown in FIG. 2 is set and the pixel values are transformed according to the set gradation curve. A plurality of gradation curves are prepared in advance in a plurality of types.

Figure 3:
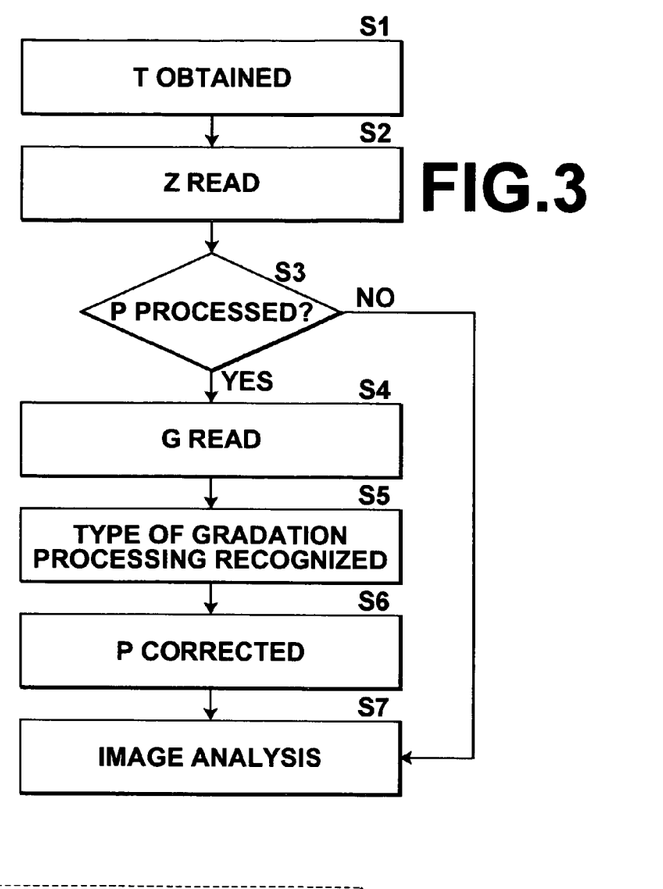
FIG. 3 is a flow chart showing operation of the image processing system 1 in accordance with a first embodiment of the present invention.

Operation of the image processing system 1 in accordance with the first embodiment of the present invention will be described with reference to the flow chart shown in FIG. 3, hereinbelow.

When an image P which is a medical image is input the image processing system 1, the image processing information obtaining means 10 obtains the image processing information T from the header information of the image P. (step S1)

The correction means 20 reads the parameter Z (the processing check information) from the image processing information T obtained (step S2) and determines whether the image P is a processed image data on the basis of the value of the parameter Z (step S3). For example, the correction means 20 determines that the image P is an unprocessed image when the parameter is 0, whereas the correction means 20 determines that the image P is a processed image when the parameter is 1.

When the image P is determined to have been processed by the determination, the parameter G is read from the image processing information T (step S4), and the type of the gradation processing which the image P has undergone is recognized (step S5). Further, transformation reverse to the gradation processing which the image has undergone is carried out on the image P to cancel the effect of the gradation processing, thereby obtaining an image Po before the gradation processing. (step S6) That is, when the image P has been processed according to the gradation curve defined by a function $d'=f(d)$, transformation defined by $Po=f^{-1}(P)$ is carried out on the image P. That is, each of the pixels of the image P is returned to have a value before the gradation processing characterized by the gradation curve. The image Po before the image processing thus obtained is output to the image analysis means 30.

While, when the image P is determined not to have been processed by the determination above, the image P is not corrected and the image P is output to the image analysis means 30 as it is.

The image analysis means 30 carries out the CAD as the image analysis on the corrected image Po or the image P which has not been processed and corresponds to an original image. (step S7) For example, the CAD may be processing in which a prospective abnormal shadow is extracted from a medical image by, for instance, filter processing, a characteristic value reflecting the probability that the prospective abnormal shadow is an abnormal shadow is calculated on the basis of the image neighbor of the prospective abnormal shadow and an abnormal shadow is extracted on the basis of the prospective abnormal shadow as disclosed, for instance, in U.S. Patent Application Publication No. 20020062075.

The formula employed in the transformation reverse to the gradation processing which the image has undergone may be determined either theoretically on the basis of the image processing which the image P has undergone or on the basis of a function and/or a table empirically obtained.

In accordance with such an image processing system 1, whether or not the image P has been processed is determined on the basis of the processing check information which is attached to the image P and represents whether or not the image P is a processed image which has undergone image processing, an image which is determined to be a processed image is corrected to an image Po before the image processing by the reverse transformation on the basis of the processing condition information which is attached to the image and represents the conditions under which the image processing has been carried out on the image and the image analysis is executed by the use of the image Po before the image processing. Accordingly, even if an image not suitable for the image analysis, e.g., a processed image, is to be analyzed, the image analysis can be executed after the image is corrected and the image-analyzing accuracy can be ensured independent of whether the image to be analyzed has undergone image processing.

The conditions of the image processing to be carried out on the image to be analyzed are generally limited according to the kind and/or application of the image. Accordingly, a method in which the image is corrected on the basis of the assumption that the image has undergone image processing representative of the image is conceivable.

That is, the correction means 20 in the image processing system 1 may be changed to a correction means which determines whether or not the image P is a processed image on the basis of the processing check information and carries out on an image which is determined to be a processed image processing reverse to a representative of image processing which the image has undergone, thereby transforming the processed image into an image equivalent to the processed image before the image processing Po'.

In accordance with the image processing system with an arrangement described above, even if only the processing check information is attached to the image P, such correction that approaches the processed image to the image before the image processing can be executed. Accordingly, suppression of deterioration in the image-analyzing accuracy can be expected.

Needless to say, the correction means 20 need not always carry out on the image which is determined to be a processed image transformation reverse to a representative of image processing which the image has undergone, and when the processing condition information is attached to the image P and the conditions of the image processing carried out on the image P can be known, image transformation reverse to the image processing carried out on the image P may be carried out on the image P on the basis of the conditions of the image processing represented by the processing condition information by preferentially using the processing condition information.

That is, the correction means 20 in the image processing system 1 may be changed to a correction means which determines whether or not the image P is a processed image on the basis of the processing check information and carries out on an image which is determined to be a processed image processing reverse to the image processing carried out on the image P when the image processing information T includes the processing condition information, thereby transforming the processed image into the processed image before the image processing Po, and processing reverse to a representative of image processing which the image has undergone, thereby transforming the processed image into an image equivalent to the processed image before the image processing Po' when the image processing information T does not include the processing condition information.

In accordance with such an image processing system, correction of the image P is switched according to whether the image P is processed and to whether the processing condition information is attached to the image P. Accordingly, independently of whether the image to be analyzed is an unprocessed image or a processed image whose processing conditions can be identified or cannot be identified, the image analysis can be executed after the image is optimally corrected.

Further, though the processing check information may be provided separately from the processing condition information as in the embodiment described above, the processing condition information may double the processing check information. For example, it is possible to indicate that the image is unprocessed when the value of the parameter which indicates the processing condition is 0.

In the embodiment described above, one image P has not always undergone one kind of image processing but has sometimes undergone a plurality of kinds of image processing. In such a case, the processing check information may be prepared for each kind of image processing, and the correction means 20 may determine whether the image processing has been carried out on the image P for each image processing and set the formula for correcting the image P on the basis of the result of the determination. Otherwise, the correction means 20 may determine whether the image which is determined to be a processed image is provided with processing condition information for each kind of image processing, and may set the formula on the basis of the processing condition information when processing condition information for the kind of image processing is attached to the image while on the basis of the processing condition of image processing representative of the image processing carried out on -the image on the basis of the assumption that the representative image processing has been carried out on the image when no processing condition information for the kind of image processing is attached to the image.

Further, there is a possibility that frequency processing has been carried out on the image in place of the gradation processing. The frequency processing is processing for enhancing a specific frequency component in the image, and may comprise transformation where, for instance, N'ij=NOij+β× (NOij−Nbij) wherein NOij represents the original image, N'ij represents an image after the transformation, Nbij represents an unsharp image of the original image by an unsharp mask processing, and β represents a coefficient. The above formula is for an enhancement processing called unsharp mask (USM) processing in which the unsharp image of the original image is subtracted from the original image and the component thus obtained is added to the original image, thereby enhancing the edges. The coefficient β in this formula is normally positive but by making the coefficient β negative, the edge components can be made unsharp.

When the processing condition information includes the values of each of the parameters and the coefficient β set in the unsharp mask processing for making Nbij, the reverse transformation for making the enhanced edges unsharp can be carried out on the image P on the basis of the processing condition information. When each of the parameters set in the unsharp mask processing is unknown, a predetermined unsharp processing may be carried out on the image P. Further, since the influence of the density artifact by the frequency processing is less as compared with that of the gradation processing, the correction for the frequency processing may be abbreviated.

Figure 4:
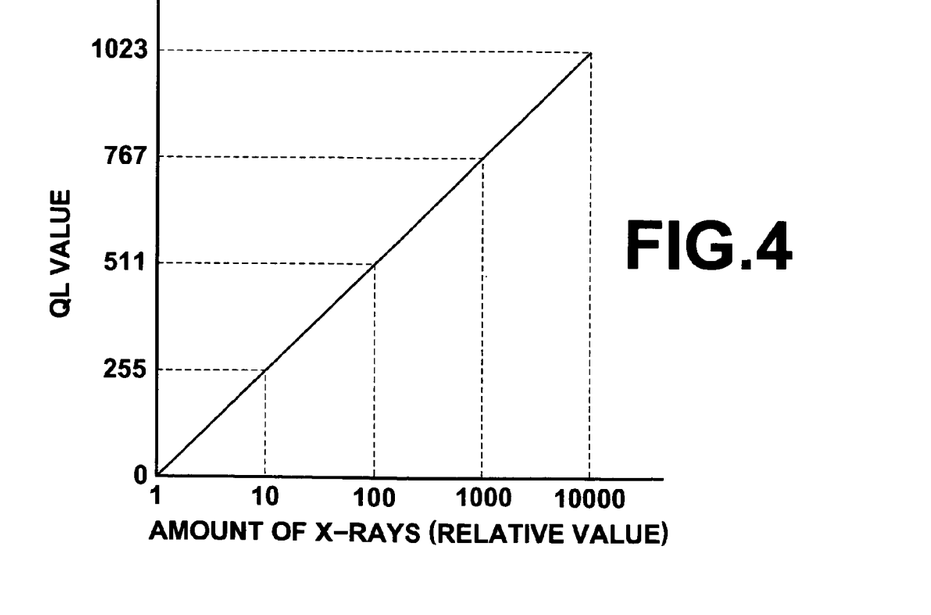
FIG. 4 is a view showing the relation where the QL value of the image and the amount of X-rays is logarithmic-linear.

As a second embodiment of the present invention, the following conditions are set. It is assumed that the image P is a medical image which is an X-ray image of the chest and the image analysis is the CAD. Further, it is assumed that the image optimal to the CAD is an image having a property under which the QL value of the image and the amount of X-rays is logarithmic-linear, that is, the logarithms of the QL value of the image and the amount of X-rays are linear to each other. The property here is a property under which the QL values of the image 0, 255, 511, 767, . . . (expressed in 10 bits) are linear against the relative values of the amount of X-rays 1, 10, 100, 1000 . . . as shown in FIG. 4. Further, the image processing information T is a step edge E in the image P. The step edge E is an image pattern in the image P which is formed of a plurality of density areas set so that the each of them is of a predetermined density in the optimal image P' having the predetermined image property and reflects the image processing carried out on the image P. For example, the step edge E is obtained by X-raying together with the object a step edge member in which the X-ray transmissivity is controlled so that the amount of X-rays projected onto each predetermined area e1, e2, e3 . . . changes stepwise in predetermined proportions like 1, 10, 100 . . . (in relative values). It is assumed that the image processing is the gradation processing.

Figure 5:
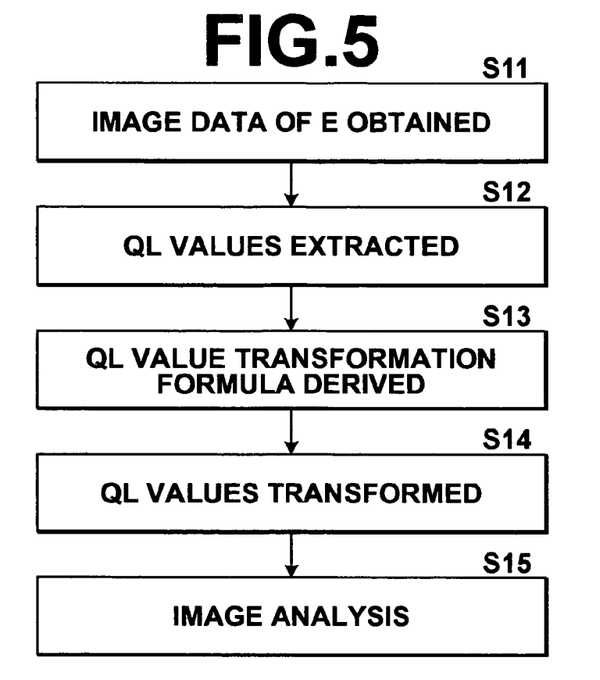
FIG. 5 is a flow chart showing operation of the image processing system 1 in accordance with a second embodiment of the present invention.

Operation of the image processing system 1 in accordance with the second embodiment of the present invention will be described with reference to the flow chart shown in FIG. 5, hereinbelow.

Figure 6:
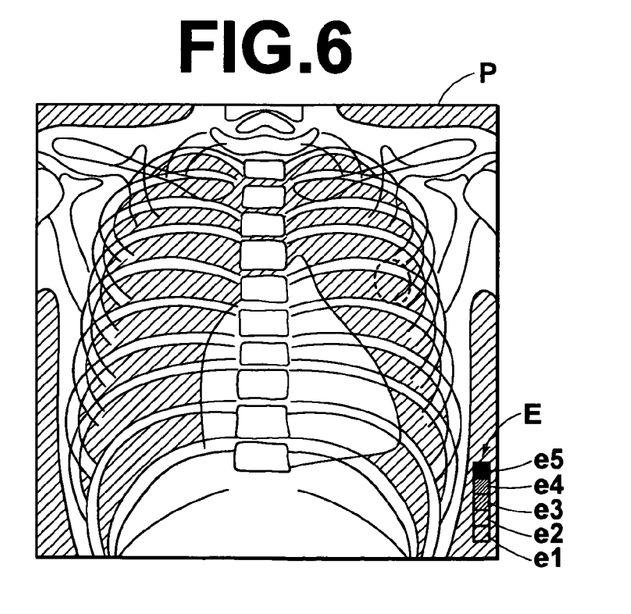
FIG. 6 is a view showing an X-ray image of the chest including a step edge.

When an image P, which is an X-ray image of the chest including a step edge E as shown in FIG. 6, is input into the image processing system 1, the image processing information obtaining means 10 obtains image data of the step edge E in the image P as the image processing information T. (step S11)

The correction means 20 extracts on the basis of the image data the QL value (q1, q2, . . . ) for each of the predetermined areas (e1, e2, e3 . . . ) formed on the step edge E by densities (step S12), obtains a formula according to which the QL values (q1, q2, . . . ) are transformed to 0, 255, 511, 767 . . . for each of the pixels on the image P (step S13) and transforms the QL value of each of the pixels on the image P (step S14). By this, an image P' where the correspondence between the QL values of the image and the amount of X-rays is logarithmic linear as shown in FIG. 4 can be obtained. The correction means 20 outputs the image P' thus obtained to the image analysis means 30.

The image analysis means 30 executes the CAD processing by the use of the image P'. (step S15)

In the image processing system 1 with this arrangement, an image pattern formed of a plurality of density areas each of which has a predetermined density on an image P' of a predetermined image property optimal to the image analysis is included in advance in the image P to be analyzed. Accordingly, even if the image P has undergone image processing, the image P can be transformed to an image P' optimal to the image analysis by transforming the image P so that the density of each density area of the image pattern exhibits said predetermined density and the image-analyzing accuracy can be ensured.

Though the image to be analyzed is a medical image and the image analysis is the CAD processing (abnormal shadow detection) in the first and second embodiments, the image to be analyzed may be a medical image while the image analysis is processing of similar image retrieval or artificial image generation.

For example, the similar image retrieval may be processing in which image data representing an object similar to that represented by the input image data is retrieved from an image database in which a number of image data representing objects is stored on the basis of not only the texture information but also the shape information and the result of the retrieval is output as proposed in Japanese Patent Application 2003-208526.

For example, the artificial image generation may be processing for artificially generating an image of normal structure of the object corresponding to the input image by obtaining normal image data representing a normal image which is a medical image representing the normal structure of the object, setting a plurality of structure changing vectors for changing the structure of the object in the medical image and adding the structure changing vectors to the normal image data, thereby generating an image of normal structure of the object as proposed in Japanese Patent Application 2003-080637.

What is claimed is:

1. A method of image processing for executing an image analysis comprising:
   attaching image enhancement processing information to an image processed for enhancement specifying image enhancement processing which the image has undergone;
   obtaining from the image, with image processing information obtaining means of a system for executing an image analysis, the image enhancement processing information attached thereto;
   correcting the image on the basis of the image enhancement processing information so that the image approaches to an image optimal to the image analysis; and
   executing image analysis on the corrected image.

2. A system for executing an image analysis comprising:
   image enhancement processing information obtaining means which obtains image enhancement processing information attached to an image processed for enhancement specifying image enhancement processing which the image has undergone;
   correction means which corrects the image on the basis of the image enhancement processing information so that the image approaches to an image optimal to the image analysis; and
   image analysis means which analyzes the corrected image.

3. A system for executing image processing as defined in claim 2 wherein the image suitable for image analysis is an image before the image enhancement processing is carried out,
   wherein the image enhancement processing information includes processing check information which represents whether the image is a processed image which has undergone image enhancement processing, and if the image is a processed image includes processing condition information which represents the condition under which the image enhancement processing has been carried out on the image, and
   wherein the correcting means determines on the basis of the processing check information whether the image is a processed image and if the image is a processed image carries out image processing reverse to the image enhancement processing which the image has undergone on the basis of the processing condition information.

4. A system for executing image processing as defined in claim 2 wherein the image enhancement processing information includes processing check information which represents whether the image is a processed image which has undergone image enhancement processing, and the correcting means determines on the basis of the processing check information whether the image is a processed image and carries out on an image which is determined to be a processed image processing reverse to a representative of image enhancement processing which the image has undergone,
   wherein the image suitable for image analysis is an image before the image processing is carried out.

5. A system for executing image processing as defined in claim 2 in which the image suitable for image analysis is an image having a specified property, the image enhancement processing information is an image pattern in the image which consists of a plurality of density regions which are set so that each of the density regions has a specified density in the image and reflects the image enhancement processing which the image has undergone, and the correcting means carries out gradation transformation on the image so that each of the density regions in the image pattern has the specified density.

6. A system for executing image processing as defined in claim 5 in which the specified image property is that under which the relation between the density of the image and a specified parameter corresponding to the density of the image is logarithmic-linear.

7. A system for executing image processing as defined in claim 2 in which the image enhancement processing includes gradation processing.

8. A system for executing image processing as defined in claim 2 in which the image enhancement processing includes frequency processing.

9. A system for executing image processing as defined in claim 2 in which the image is a medical image and the image analysis is abnormal shadow detection.

10. A system for executing image processing as defined in claim 2 in which the image is a medical image and the image analysis is similar image retrieval.

11. A system for executing image processing as defined in claim 2 in which the image is a medical image and the image analysis is artificial image generation.

12. A tangible computer readable medium having stored therein a program for causing a computer to execute image processing, said program including computer executable instructions for performing steps comprising:
    inputting an image having attached to thereto image enhancement processing information related to image enhancement processing which the image has undergone;
    obtaining the attached image enhancement processing information from the image;
    correcting the image on the basis of the image enhancement processing information so that the image approaches an image suitable for image analysis; and
    executing specified image analysis on the corrected image.

13. The method of claim 1, wherein the image is corrected based on the image enhancement processing information to produce a corrected image approximately the same as before the image enhancement processing was applied.

14. The system of claim 2, wherein the correction means corrects the image based on the image enhancement processing information to produce a corrected image approximately the same as before the image processing was applied.

15. The system of claim 1, wherein enhancement processing comprises a visually perceptible enhancement.

* * * * *